TELEPHONE SYSTEM

Filed March 28, 1956 3 Sheets-Sheet 1

INVENTOR.
WILLIAM W. PHARIS
BY [signature]
ATTORNEY

Dec. 8, 1959 W. W. PHARIS 2,916,554

TELEPHONE SYSTEM

Filed March 28, 1956 3 Sheets-Sheet 3

United States Patent Office 2,916,554
Patented Dec. 8, 1959

2,916,554

TELEPHONE SYSTEM

William W. Pharis, Rochester, N.Y., assignor to General Dynamics Corporation, Rochester, N.Y., a corporation of Delaware Application March 28, 1956, Serial No. 574,415
4 Claims. (Cl. 179—18)

This invention relates to telephone systems and more particularly to switching means for use in such systems.

As is well known in the art, selectors, connectors, and the like, may be provided in automatic telephone systems as part of switching means by which calls may be extended from calling lines or trunks to called lines or trunks. Referring particularly to calls extended over trunks, it is normal to interpose trunk circuits between trunks and selectors or other switching means that may be seized from such trunks. Trunk circuits provide certain supervisory functions that are necessary to complete calls. It is desirable to eliminate parts, equipment, components and the like, to reduce the cost and complexity of telephone sytsems. For example, under some conditions, it is possible to combine the functions of a plurality of circuits into a single circuit, thereby eliminating some parts, equipment, components and the like.

Therefore, an object of my invention is to provide a new and improved telephone system.

It is another object of my invention to provide trunks without requiring trunk circuits to terminate those trunks.

Still another object of this invention is to provide new and improved switching means.

Yet another object of this invention is to provide a switching means which also functions as a trunk circuit.

In accordance with my invention I have provided a system whereby an incoming trunk may be extended directly to switching means without the need for an intervening trunk circuit. This system involves a new and improved switching means which has two points of access. One point of access is used on calls which are extended to a trunk from a local system. The other point of access is connected directly to a trunk and is used on calls which are extended from a trunk to a local system. During incoming trunk calls, my switching means connects a trunk to a local system and disables the point of access that is used on calls which are extended from a local system to a trunk. Following this, an incoming trunk call may be completed via a local system as in the case of a local call. On outgoing trunk calls, the other point of access is connected directly to a trunk and the switching portion of my switching means is disabled insofar as calls to the local switching system are involved.

Further objects and advantages of my invention may be understood by referring to the following description taken in connection with the accompanying drawings in which:

Fig. 1 is a block diagram illustrating a telephone system embodying the principles of my invention;

Figs. 2 and 3 are detailed circuit drawings of a selector that may be used as selector 120 in the system shown in Fig. 1; and Fig. 4 shows the manner in which Figs. 2 and 3 should be joined to provide a complete and understandable circuit.

The attached drawings show the source of office potential by means of plus (+) and minus (−) signs.

As in most telephone systems, the plus terminal is described as being connected to ground; however, it should be understood that either this or any other suitable power supply may be used.

The heavily inked lines used to outline block 120 indicates that portion of the system which is shown in detail by means of Figs. 2 and 3. The remaining blocks in Fig. 1, that are shown by lightly inked rectangles, are items which are well known to those skilled in the art. Any suitable equipment may be used to provide the functions represented by these blocks.

I have tried to use simple and specific terms where possible to facilitate an understanding of the invention; however, I want it understood that the use of these simple and specific terms is not to act in any manner as a disclaimer of the full range of equivalents which is normally given under established rules of patent law. To illustrate, hereinafter, I refer to my invention as relating to switching means of the type that is known as a "selector" when, in fact, my invention is broader in that it could relate to any switching means that may be accessible to a trunk, such as a connector, for example. Also, I have shown my invention in connection with a two-motion, flat-type, step-by-step switch such as that which is commonly sold under the trademark "XY." Not only is the invention not limited to this particular switch, but also it is not necessarily limited to step-by-step switches. Quite obviously other examples could be selected to illustrate the manner in which the specific terms that I have used are entitled to a wider range of equivalents.

*Brief description*

Reference is made to Fig. 1 which shows distant office 150 and local office 151 interconnected by trunk line 130. The local office may include suitable switching means designated 101—106 and 120—122. The distant office may include an operator position 140. Except for selector 120, these elements function in a well known manner. The particular features of selector 120 that are most important to an understanding of my invention are shown in block 120 while the details of selector 120 are reserved for the showing in Figs. 2 and 3.

First, it is assumed that the subscriber at station A wishes to complete a call (hereinafter called "local call") to subscriber station B, for example. The call may be initiated when subscriber A removes his handset or receiver whereupon line circuit 101 is marked. Responsive thereto, line finder 103, which has been preassigned by allotter 102, is directed to find the calling line. Suitable digit pulses may be transmitted by subscriber A to control selector 104 and connector 105 to seize and signal called subscriber line B.

Next, it is assumed that the subscriber at station A wishes to make a call (hereinafter called "outgoing trunk call" to operator position 140 which is in distant office 150. As in the case of a local call, an outgoing trunk call is initiated when the receiver or handset is removed, thereby marking line circuit 101. Line finder 103 responds and finds the calling line after which subscriber A dials to cause selector 104 and connector 105 to seize selector 120. Sleeve conductor S1 is marked by any suitable means, thereby operating switchthrough relay 220 and in turn causing contacts 222 and 224 to close and extend the call (i.e., conductors T1 and R1) to the trunk line 130. Calling bridge relay 230 is disconnected at contacts 221 and 223 so that selector 120 may not respond, thereby effectively blocking calls to connector 121.

The next call (herinafter called "incoming trunk call") is assumed to be one extended from operator position 140 over trunk line 130 to subscriber C. This call is extended at a time when selector 120 is idle and relays 210, 220 and 230 are released; therefore, relay 230 responds to seizure and causes master ground to be applied to operate cut-off relay 210 as shown in detail in Figs. 2 and 3. Responsive thereto, contacts 211 and 212 open effectively to block any calls that might otherwise be extended over conductors 110. The operator at position 140 dials to set selector 120 and connector 121 to seize and signal subscriber station C.

*Detailed description*

Figures 1, 4:
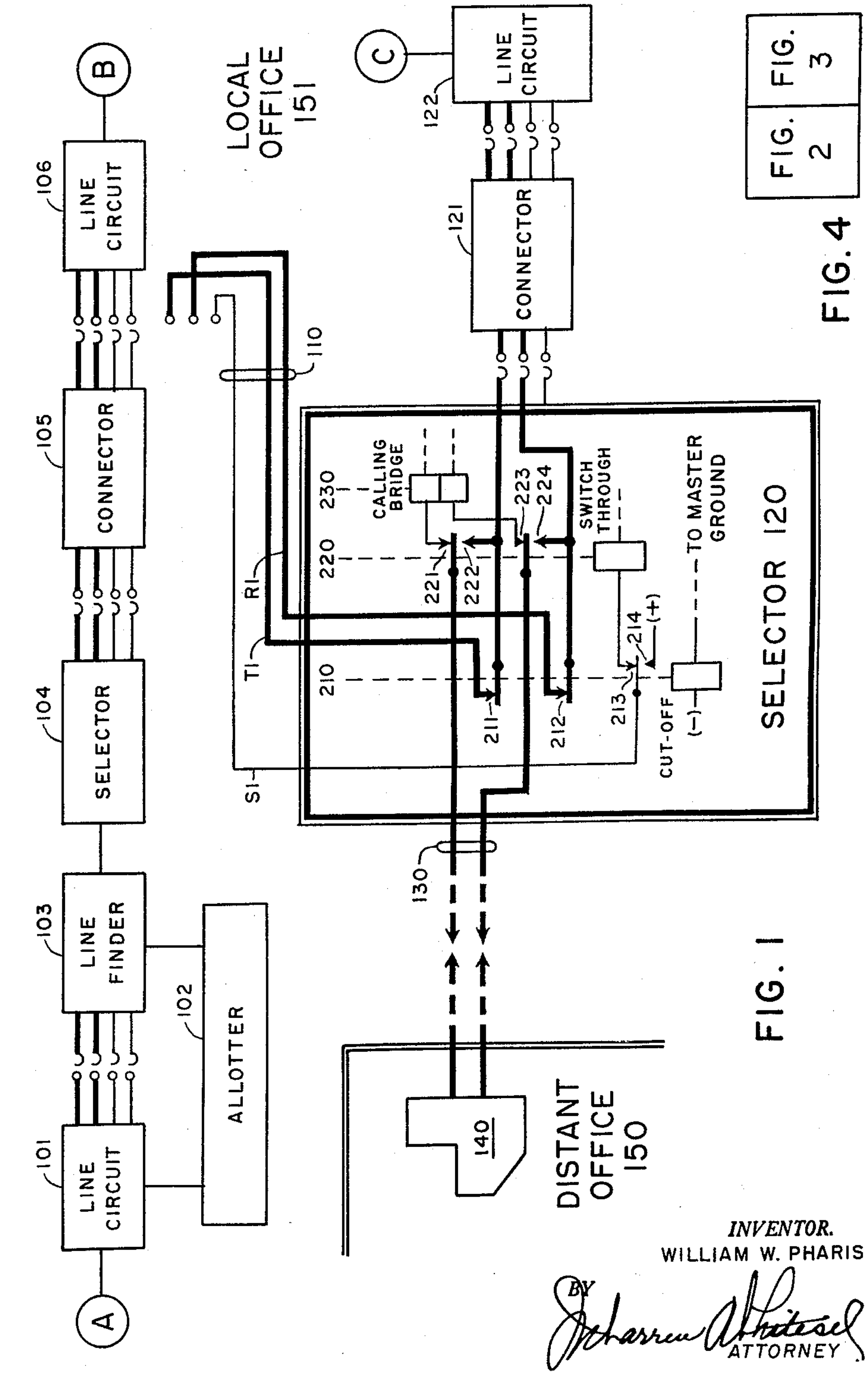
Figure 2:
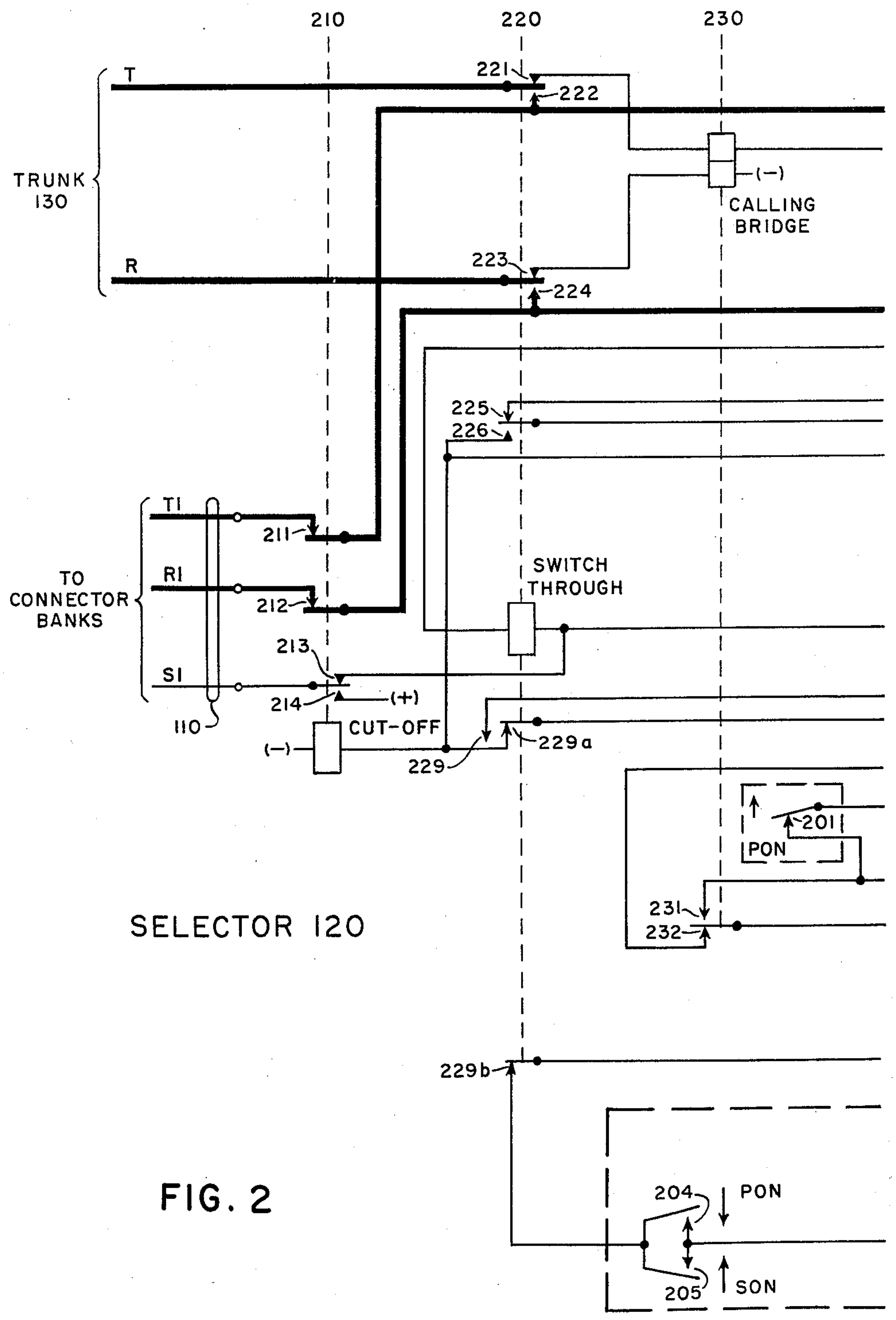
Figure 3:
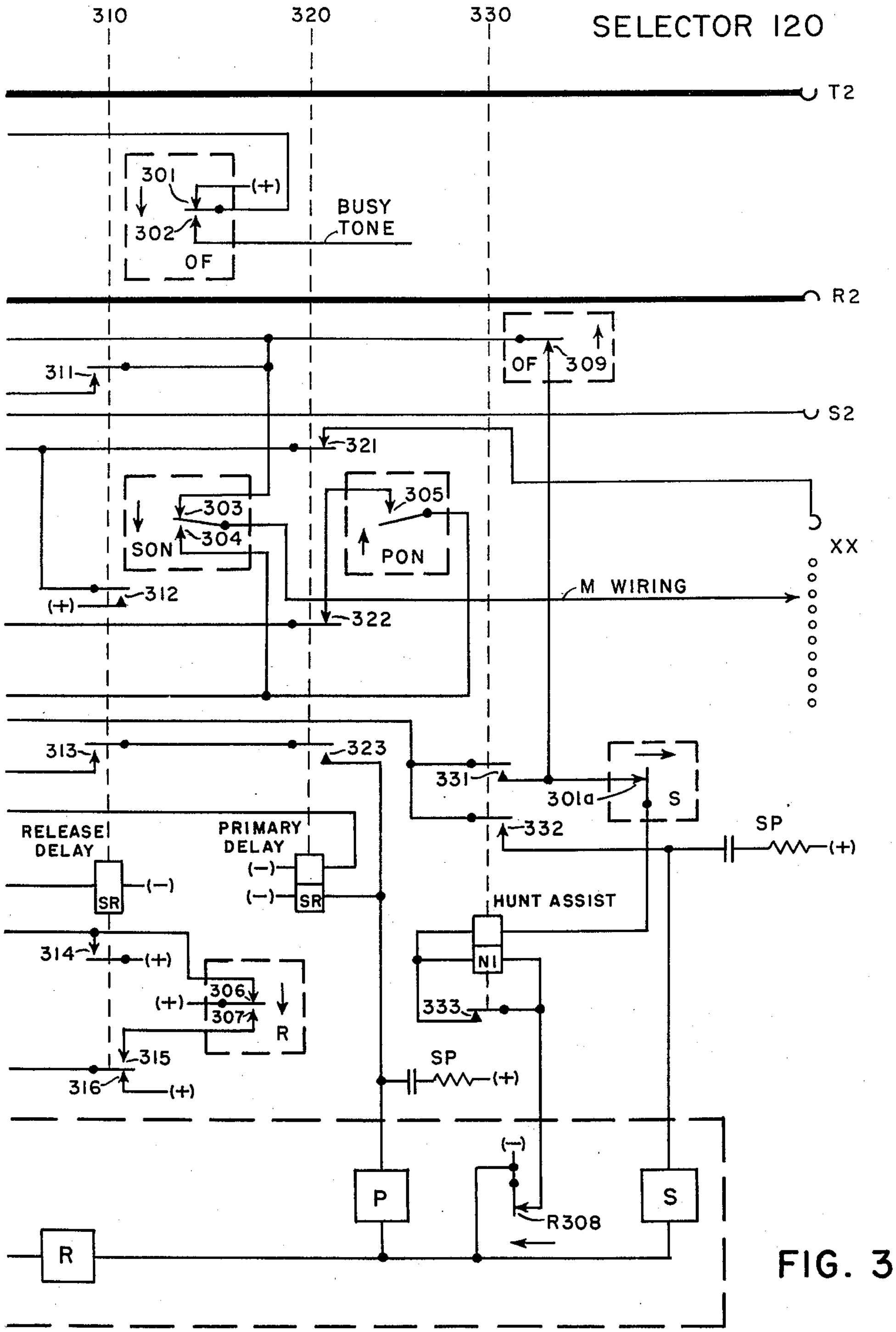

It is thought that my invention may be better understood by making reference to the circuit drawing of Figs. 2 and 3, which include the details of selector 120. For example, the brushes that are shown near the upper righthand portion of Fig. 3 are the same as those which are shown in Fig. 1 as interconnecting selector 120 and connector 121. Trunk line 130, comprising conductors T and R, is shown in the upper left-hand corner of Fig. 2. Conductors T1, R1 and S1, which are the same as line 110 of Fig. 1, are shown near the middle of the left-hand edge of Fig. 2. Hence, it is seen that selector 120 is provided with two points of access, i.e., trunk 130 and line 110. As will be pointed out below, the function of selector 120 depends upon which point of access is used.

*Incoming trunk call*

The first call to be described is one which is incoming over trunk conductors T and R. There is no trunk circuit so that the connection to selector 120 is made directly from the trunk line. It is assumed that any suitable means (not shown) is provided to complete a loop across conductors T and R thereby extending a seizure signal to selector 120.

*Seizure.*—Means is provided for initiating the operation of selector 120 when a circuit is completed for operating calling bridge relay 230 over a loop extending from ground (+) appearing on normal contacts OF301 of the over-flow spring pile-up, the upper winding of calling bridge relay 230, normal contacts 221, tip conductor T, trunk line 130, a calling loop, ring conductor R, normal contacts 223, and the lower winding of calling bridge relay 230 to (−) battery. Responsive to the operation of relay 230, contacts 231 close to complete a two-branch circuit for operating release delay relay 310 and primary delay relay 320. The branch of this circuit that is used for operating release delay relay 310 may be traced from (−) battery through the winding of relay 310 and operated contacts 231 to ground (+) appearing on resting release magnet interrupter contacts R306. The other branch of the circuit that is used for operating primary delay relay 320 may be traced from (−) battery through the upper winding of relay 320, resting primary off-normal contacts PON201, operated contacts 231 and contacts R306 to ground (+).

Upon operating, release delay relay 310 closes contacts 311 to prepare for busy testing during secondary switch motion and closes contacts 312 to provide a master ground marking which is used to hold preceding equipment, to mark selector 120 busy to other calls, and to control certain selector functions. Contacts 316 open to break a release circuit that is not required until the end of the call. Contacts 314 complete a locking circuit via contacts 231 for holding release delay relay 310 in an operated condition. Contacts 313 close to prepare for switch motion.

Responsive to the operation of relay 310, cut-off relay 210 operates over an obvious circuit extending from master ground appearing on operated contacts 312. Cut-off relay 210 opens contacts 211 and 212 to break conductors T1 and R1 thereby disabling the point of access that is used on outgoing trunk calls. Contacts 214 close to mark this point of access as busy to certain local equipment, such as a connector, for example, by applying ground (+) potential to conductor S1.

As pointed out above, primary delay relay 320 operates responsive to the operation of calling bridge relay 230. Contacts 321 open to prevent the application of ground (+) to conductor XX during primary switch motion; contacts 322 open thereby disabling switch-through relay 220 during primary switch motion; and contacts 323 close to prepare a circuit for holding primary delay relay 320 during primary switch motion.

Selector 120 is prepared to receive digit pulses and nothing further happens until they are received.

*Dialing.*—Briefly, selector 120 may be controlled in any well known manner. For example, it may respond to the manipulation of a digit sending device, such as a dial or key sender. Various signaling schemes have been designed to transmit the output of these digit sending devices, such as those schemes which are known as simplex, polar-duplex, loop pulsing and the like. The invention may be adapted to utilize any of these or other schemes; however, I have chosen to show the particular scheme that is known as loop pulsing. Briefly, loop pulsing is accomplished by means of a pair of talking conductors T and R, which are interconnected at one end by means of impulsing contacts (not shown) controlled by a digit sending device and connected at the other end through the windings of calling bridge relay 230. In this manner, calling bridge relay 230 releases and reoperates as a digit sending device opens and closes the impulsing contacts. The mechanical structure of the selector switch causes it to take one step in its primary direction each time that calling bridge relay 230 releases. Various primary off-normal contacts, marked "PON" in the drawing, are opened responsive to the first step in the primary direction.

In greater detail, each time that calling bridge relay 230 restores and reoperates responsive to a digit pulse, contacts 232 open and close to repeat a dial pulse to stepping magnet P over the circuit extending from (−) battery through the winding of primary stepping magnet P, operated contacts 323, 313, 232 and 314 to ground (+) and in parallel therewith to ground (+) at contacts R306. Brushes T2, R2 and S2 of the selector switch are driven in their primary direction at the rate of one step per pulse.

Primary off-normal contacts (marked "PON") operate when a switch takes its first step in a primary direction, i.e., contacts PON204 close to prepare for the release of the switch while contacts PON305 close to prepare for secondary switch motion. Contacts PON201 open and the upper winding of primary delay relay 320 is de-energized; thereafter, relay 320 is held responsive to pulse-like energizing current that is transmitteed by contacts 232 over a circuit extending from (−) battery through the lower winding of primary delay relay 320, operated contacts 323, 313, released contacts 232 and operated contacts 314 to ground (+) and in parallel therewith to ground (+) at contacts R306. During a digit pulse train, the slow release characteristics of relay 320 hold it operated over the interpulse period while contacts 232 are open.

Relay 320 releases after the last pulse in the digit pulse train is terminated because contacts 232 remain open for a period of time which is longer than the slow release time of primary delay relay 320. When relay 320 restores, contacts 323 open thereby breaking the stepping circuit to primary magnet P. Contacts 321 close to prepare for secondary switch motion. Contacts 322 close to prepare for busy test.

The selector is now ready for secondary switch motion. Relays 210, 230 and 310 are operated and the switch brushes are standing opposite the level in the switch bank of terminals through which this particular call is to be extended.

*Secondary switch motion.*—The next switching function, which is sometimes called "trunk hunting," follows automatically. That is, responsive to the release of primary delay relay 320, hunt assist relay 330 is operated over an initial circuit that is completed from ground (+) through operated contacts 312, released contacts 321, conductor and brush XX, wiring M, resting secondary off-normal contacts SON303, resting overflow contacts OF309, resting secondary magnet interrupter contacts S301*a*, the upper winding of hunt assist relay 330, resting contacts 333 and unoperated release magnet interrupter contacts R308 to (−) battery. Responsive to the operation of relay 330, contacts 332 close thereby operating secondary stepping magnet S over the circuit which extends from (−) battery through the winding of secondary magnet S, operated contacts 332, 229*a* and contacts 312 to ground (+). Magnet S operates and brushes T2, R2 and S2 take their first step in the secondary direction.

The various secondary off-normal contacts (marked "SON") open responsive to this first step. Contacts SON205 close to prepare an alternate circuit for releasing the switch at the end of the call. Contacts SON303 open to break the initial circuit over which hunt assist relay 330 operated, while contacts SON304 close to prepare for busy test.

Secondary magnet S operates secondary interrupter contacts S301*a* near the end of each step in the secondary direction. Hunt assist relay 330 releases when its circuit is broken by contacts S301*a*. When relay 330 releases, contacts 332 open thus restoring secondary magnet S.

Means is provided to make a busy test to determine whether the switch encounters idle or busy marked terminals on its first step in the secondary direction. That is, a test circuit is completed from brush and conductor S2 to resting contacts 225, operated contacts 311, resting contacts OF309, resting secondary contacts S301*a*, the upper winding of hunt assist relay 330, resting contacts 333 and contacts R308 to (−) battery. Hunt assist relay 330 operates at this time only if a busy ground marking is applied to brush and conductor S2. If so, contacts 332 close thus causing secondary magnet S to operate and drive the switch one step further. At this point it should be noted that contacts 331 are provided to preserve a ground connection for holding relay 330 after brush S2 is stepped from the busy marked terminals. The circuit for extending this connection may be traced from (−) battery through contacts R308, 333, the upper winding of relay 330, contacts S301*a*, relay contacts 331, 229*a* and 312 to ground (+). At the end of the second step, contacts S301*a* open thereby releasing hunt assist relay 330. If the terminals encountered on the second step are also busy, a ground (+) marking is applied to conductor S2 for causing the selector to take still another step. This process is repeated as long as busy markings are found by brush S2 or until overflow is reached in the manner explained below.

Each time that brush S2 encounters a busy ground marking, switch-through relay 220 is shunted over a circuit which extends from the busy ground marking applied to brush and conductor S2, through rest contacts 225, operated contacts 311, the winding of switch through relay 220, rest contacts 322, operated primary off-normal contacts PON305, operated secondary off-normal contacts SON304, wiring M, brush and conductor XX, rest contacts 321 and operated contacts 312 to ground (+). On the other hand, when the switch encounters an idle trunk, no ground (+) marking is applied to brush S2; hence, hunt assist relay 330 does not reoperate and contacts 332 remain open so that secondary magnet S is not reoperated. Secondary switch motion ends.

*Switchthrough.*—Means is provided for causing selector 120 to switch through when an idle line is found. More particularly, when an idle line is found, there is an absence of ground on brush S2 so that switchthrough relay 220 is no longer shunted. At this time a circuit may be traced from (−) battery through release magnet interrupter contacts R308, resting contacts 333, the upper winding of hunt assist relay 330, resting secondary magnet interrupter contacts 301*a*, resting overflow contacts OF309, the winding of switchthrough relay 220, resting contacts 322, operated primary off-normal contacts PON305, operated secondary off-normal contacts SON304, wiring M, brush and conductors XX, resting contacts 321 and operated contacts 312 to ground (+). Switchthrough relay 220 and hunt assist relay 330 are arranged so that the switchthrough relay operates but the hunt assist relay does not operate over this circuit.

Responsive to the operation of relay 220, contacts 221 and 223 open thereby releasing calling bridge relay 230. Contacts 222 and 224 close to connect talking conductors T and R to brushes T2 and R2. Contacts 225 open and contacts 226 close thereby connecting switchthrough relay 220 to be controlled by the holding ground marking (not shown) applied to conductor S2 by the following equipment over the circuit that may be traced from the busy ground on connector S2, through contacts 226, 229, PON305, 322, the winding of relay 220, contacts OF309, S301*a*, the upper winding of relay 330, contacts 333 and R308 to (−) battery. Contacts 229 open part of the release circuit.

When calling bridge relay 230 restores, it opens contacts 231 thereby allowing release delay relay 310 to restore. Contacts 312, controlled by relay 310, open to remove master ground (+) since the only holding ground that is required after switchthrough is returned from the following equipment over conductor S2. Contacts 314 remove one of the ground connections that was useful when the circuit was first seized, while contacts 316 close in preparation for release of the switch.

*Release.*—Nothing further happens in selector 120 until the call is terminated, after which time ground is removed by any suitable means (not shown) from conductor S2 thereby releasing switchthrough relay 220. Responsive thereto, contacts 221 and 223 close to return calling bridge relay 230 to its normal connection with trunk line 130. Contacts 229*b* close thereby extending a release circuit from ground (+) through contacts 316, 229*b*, contacts PON204 and SON205 in parallel, and the winding of release magnet R to (−) battery.

The switch returns to normal when magnet R operates. Release magnet interrupter contacts R308 open during release to restore hunt assist relay 330 if it is then operated. Contacts 307 close to insure a complete switch release in case the calling operator continues to hold after release, at which time relays 230 and 310 may reoperate. Contacts R306 open to reduce the chance that relay 310 may operate.

*Overflow.*—If the selector does not encounter any idle equipment during its secondary switch motion, the brushes are stepped to an overflow position at which time contacts OF301 open and OF302 close to connect busy tone through the upper winding of relay 230 and over the talking conductors T and R of trunk 130. Overflow contacts OF309 open so that the switch may not take any further steps in its secondary direction. Nothing further happens until the operator at position 140 (Fig. 1) releases.

*Outgoing trunk call*

The next call to be described is one which may be extended from a local subscriber line through selector 120 and over trunk line 130 to distant office 150 (Fig. 1). To initiate this call, subscriber A removes his receiver or handset following which line circuit 101 (Fig. 1), allotter 102, line finder 103, selector 104 and connector 105 cooperate to extend the call over line 110 to selector 120.

When selector 120 is seized, connector 105 completes a circuit from ground (not shown), over conductor S1 (Fig. 2), contacts 213, the winding of switchthrough relay 220, resting overflow contacts OF309, resting secondary magnet interrupter contacts S301*a*, the upper winding of hunt assist relay 330, contacts 333 and R308 to (−) battery. The circuit values are such that hunt assist relay 330 does not operate when energized over this circuit, but that switchthrough relay 220 does operate thereby connecting conductors T1 and R1 to conductors T and R, respectively, at contacts 222 and 224. The connector extends ringing current as on a conventional call to signal the operator at position 140 (Fig. 1). The local subscriber may now talk over trunk line 130 to operator 140 at the distant exchange.

Selector 120 is marked busy to other connectors by a ground potential which is forward from connector 105 over sleeve conductor S1. There is no need for marking trunk 130 busy at this end because equipment in distant office 150 (Fig. 1) is adapted to mark trunk 130 according to the needs of that office.

Conversation may follow and nothing further happens in the circuit until the call is disconnected at which time connector 105 removes the ground potential from conductor S1 thereby releasing switchthrough relay 220. Responsive thereto, the circuit is returned to normal and is ready for the next call.

While I have shown and described a single embodiment of my invention, various modifications may be made thereto without departing from the spirit thereof. For this reason, I intend to cover in the attached claims not only the particular embodiment that is shown in the drawings, but also to cover all modifications which may fall within the true spirit of my invention.

What is claimed is:

1. In a telephone system, first and second telephone offices, said first office including digit pulse controlled automatic switch means for completing calls comprising two points of access and switch brushes, means including a trunk line for interconnecting said offices, said trunk line terminating in one of said points of access, means for extending calls within said first office having access to the other of said points of access, means responsive to digit pulse control signals transmitted over said trunk from said second office to said first office for directing said automatic switch means to operate said brushes to seize said means for extending calls, means effective on calls from said first office to said second office for directing said means for extending calls to seize said automatic switch means over said other point of access, and means in said automatic switch means effective without operating said switch brushes for connecting said other point of access to said trunk line responsive to said seizure over said other point of access, whereby said automatic switch means functions as a trunk circuit.

2. A telephone system comprising means including an automatic switch controlled responsive to digit pulses for extending calls, said first named means having two points of access, means normally connecting said first named means for control over both of said points of access, a trunk line terminating in a first of said points of access, means for switching calls within an exchange having access to a second of said points of access, means responsive to calls completed to said first point of access for busy marking said second point of access, means responsive to digit pulses received over said first point of access for causing said automatic switch to connect with said means for switching calls, and means responsive to calls over said second point of access for causing said first named means to interconnect said first and said second points of access, whereby said first named means functions as a trunk circuit.

3. In a telephone system, selector means for extending connections comprising talking conductors, switching means, and two points of access; means normally connected for controlling said switching means when seizure of said selector is over one of said points of access, means responsive to said control means for connecting said talking conductors through said switching means if idle equipment is available, means whereby the other of said points of access is operatively associated with said one point of access, means responsive to operation of said control means for disabiling said other point of access; means effective when seizure of said selector is over said other point of access for operating said means for connecting said talking conductors, and means responsive to operation of said means for connecting said talking conductors for disabling said control means and for interconnecting said two points of access in said selector means without operating said switching means whereby said selector functions as a trunk circuit.

4. Switching means for use in telephone systems comprising a plurality of brushes for extending connections from said switching means and two operatively associated points of access; first relay means normally connected to be controlled over one of said two points of access, means responsive to the operation of said first relay means for controlling said switching means to extend calls over said brushes; second relay means for connecting said one point of access through said switching means to said brushes, for interconnecting said points of access, and for disabling said first relay means; means responsive to the extension of a call by said switching means for operating said second relay means; third relay means for disabling the other of said points of access; means responsive to operation of said first relay means for operating said third relay means thereby disabling said other point of access; and means responsive to calls extended over said other point of access for operating said second relay means thereby interconnecting said points of access and disabling said first relay means.

References Cited in the file of this patent

UNITED STATES PATENTS

| | | |
|---|---|---|
| Re. 17,666 | Hinrichsen | May 13, 1930 |
| 1,739,245 | Lomax | Dec. 10, 1929 |
| 1,775,146 | Tharp | Sept. 9, 1930 |
| 2,335,481 | Boswau | Nov. 30, 1943 |
| 2,391,389 | Burgener | Dec. 25, 1945 |
| 2,465,359 | Deakin | Mar. 29, 1949 |